(12) United States Patent
Mandet et al.

(10) Patent No.: US 7,614,236 B2
(45) Date of Patent: Nov. 10, 2009

(54) POSITIONING BRIDGE GUIDE AND ITS UTILISATION FOR THE NOZZLE SUPPORT PIPE OF A TURBOPROP

(75) Inventors: Emmanuel Christophe Mandet, Echouboulains (FR); Jacques-A Roche, Lisses (FR); Laurent Claude Patrick Salperwyck, Lizines (FR)

(73) Assignee: Snecma, Paris (FR)

( * ) Notice: Subject to any disclaimer, the term of this patent is extended or adjusted under 35 U.S.C. 154(b) by 329 days.

(21) Appl. No.: 11/075,851

(22) Filed: Mar. 10, 2005

(65) Prior Publication Data
US 2006/0038064 A1    Feb. 23, 2006

(30) Foreign Application Priority Data
Mar. 15, 2004   (FR) .................... 04 50518

(51) Int. Cl.
*F02K 3/10* (2006.01)
(52) U.S. Cl. .......................... 60/766; 60/796
(58) Field of Classification Search .............. 60/766, 60/796
See application file for complete search history.

(56) References Cited

U.S. PATENT DOCUMENTS

| | | | | |
|---|---|---|---|---|
| 2,794,319 A | * | 6/1957 | Stockdale | 60/766 |
| 2,795,108 A | | 6/1957 | Saldin | 60/796 |
| 3,398,527 A | * | 8/1968 | Taylor et al. | 60/752 |
| 3,848,697 A | * | 11/1974 | Jannot et al. | 181/220 |
| 4,718,230 A | * | 1/1988 | Honeycutt et al. | 60/766 |
| 4,833,881 A | * | 5/1989 | Vdoviak et al. | 60/762 |
| 4,864,818 A | * | 9/1989 | Taylor | 60/766 |
| 5,069,034 A | * | 12/1991 | Jourdain et al. | 60/766 |
| 5,144,795 A | * | 9/1992 | Field | 60/226.1 |
| 5,201,887 A | | 4/1993 | Bruchez, Jr. et al. | 60/766 |
| 5,337,583 A | * | 8/1994 | Giles et al. | 60/752 |
| 5,483,794 A | * | 1/1996 | Nicoll et al. | 60/766 |
| 6,041,590 A | * | 3/2000 | Hayton et al. | 60/766 |
| 6,199,371 B1 | * | 3/2001 | Brewer et al. | 60/766 |
| 6,394,537 B1 | | 5/2002 | DeRees | 296/191 |
| 6,655,147 B2 | * | 12/2003 | Farmer et al. | 60/752 |

FOREIGN PATENT DOCUMENTS

DE    100 10 580 A1    9/2001

* cited by examiner

*Primary Examiner*—Tara Mayo-Pinnock
(74) *Attorney, Agent, or Firm*—Oblon, Spivak, McClelland, Maier & Neustadt, L.L.P.

(57) ABSTRACT

A bridge positioned between two parts, such as a nozzle support pipe envelope and a heat shield liner, includes a central part with inversed curvature thus having two contact zones with the nozzle support pipe envelope. Furthermore, the bridge includes two lugs, one of which can be mounted to slide in the heat shield liner.

14 Claims, 2 Drawing Sheets

POSITIONING BRIDGE GUIDE AND ITS UTILISATION FOR THE NOZZLE SUPPORT PIPE OF A TURBOPROP

FIELD OF THE INVENTION

The invention relates to the field of turboprops used in aeronautics, and more precisely the relative positioning of the heat shield liner and the nozzle support pipe for a thrusters, in particular a thrusters with cooling bypass air flow.

PRIOR ART AND THE PROBLEM POSED

Figure 1:
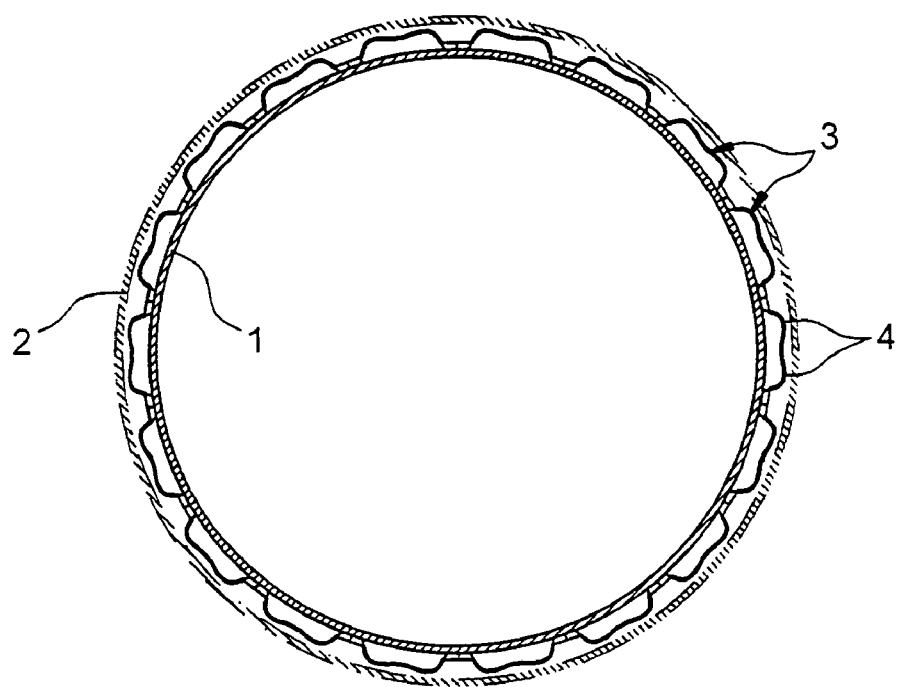

In military type turboprops, using cooling bypass air flow, it is necessary to be able to constantly position the heat shield liner at the level of the nozzle relative to the nozzle support pipe. In other words, this involves centering the heat shield liner. In order to achieve this, bridge guides are used, spaced around the whole circumference of the internal envelope, that is the heat shield liner. Reference can be made to figure 1 without taking into account the shape of the bridge guides 3 placed between the heat shield liner 1 and the nozzle support pipe envelope 2. Furthermore, these bridge guides must also fulfill a diaphragm function relative to the bypass air flow circulating between the internal protection, meaning the heat shield liner and the external envelope, meaning the nozzle support pipe. Finally, they can contribute to preventing heat shield liner resonance modes below a certain frequency.

In general, the bridge guides are riveted onto the heat shield liner, spot welding sometimes causing tearing. The main inconvenience of this solution is the lack of flexibility. In fact, under a compression load due to a thermal expansion difference and a pressure differential between the nozzle support pipe and the heat shield liner, the bridge guide uprights are rapidly butted and the maximum admissible stress is quickly reached. The risks associated with this lack of flexibility are, amongst other things, the fact that the deformation may be transmitted to the nozzle support pipe and the heat shield liner. But these parts are complex, expensive and, if damaged, are liable to cause malfunctions of the turboprop. In particular, there is the possibility of implosion of the heat shield liner bringing about partial obstruction of the engine main exhaust flow, local dishing of the nozzle support pipe with associated ruptures.

A solution using very small height bridge guides fixed on a circular diaphragm riveted onto the liner is more flexible in operation. On the other hand, the thermal gradient between the diaphragm upstream and downstream is not satisfactory for the engine structure. In fact, thermal fatigue has been noted, provoking longitudinal and then circumferential edge cracks leading up to loss of sector portions.

Taking into account these different techniques and comments, the aim of the invention is to remedy the above-mentioned inconveniences and to propose another type of bridge guide, knowing that the bridge guides must ensure three principal functions. The first consists ideally of touching the nozzle support pipe as soon as possible, in order to centre the heat shield liner. It can be noted that increasing the number of supports makes it possible to increase the buckling capacity of the heat shield liner. A second function is to allow the best possible calibration of the diaphragm sections in the bypass air flow. And finally, the third function is absorption of significant multi-directional and differential expansions at the level of the turboprop.

SUMMARY OF THE INVENTION

As a result, a first aim of the invention is a positioning bridge guide with two parts related to each other, these two parts being able to undergo variations concerning their relative position, the bridge guide being constituted of a metallic bar principally comprising:
  two lugs constituted by the two bar ends, that must be in contact with a first of the two parts;
  a central cambered part connecting the two lugs, and having at least one cambered summit zone constituting at least one contact zone with the second of the two parts.

According to the invention, the cambered central part has an inversed central camber, thus defining two summit zones constituting two contact points with the second of the two parts.

In a particular embodiment of the invention, with the aim of allowing a certain amount of circumferential expansion, a single one of the two lugs is fixed on the first of the two parts, the other lug not being in contact with it, thus allowing tangential movement relative to the first of the two parts.

In this case, it is interesting to produce this assembly having a slot in the second lug in the longitudinal direction of the bar constituting the bridge piece.

In the case, it is advantageous to complete this assembly by means of a T-shaped guide pin, integral with the first part and whose T-shaped foot is placed in the slot.

A preferred embodiment consists also of providing the junction between the cambered central part and the lugs with a low radius of curvature.

A second particular aim of the invention is a device for positioning and adaptation to the differential expansions between the heat shield liner and the nozzle support pipe envelope of a turboprop.

According to the invention, bridge pieces are used comprising the characteristics described above and fixed on the heat shield liner.

LIST OF FUGURES

Figure 2:
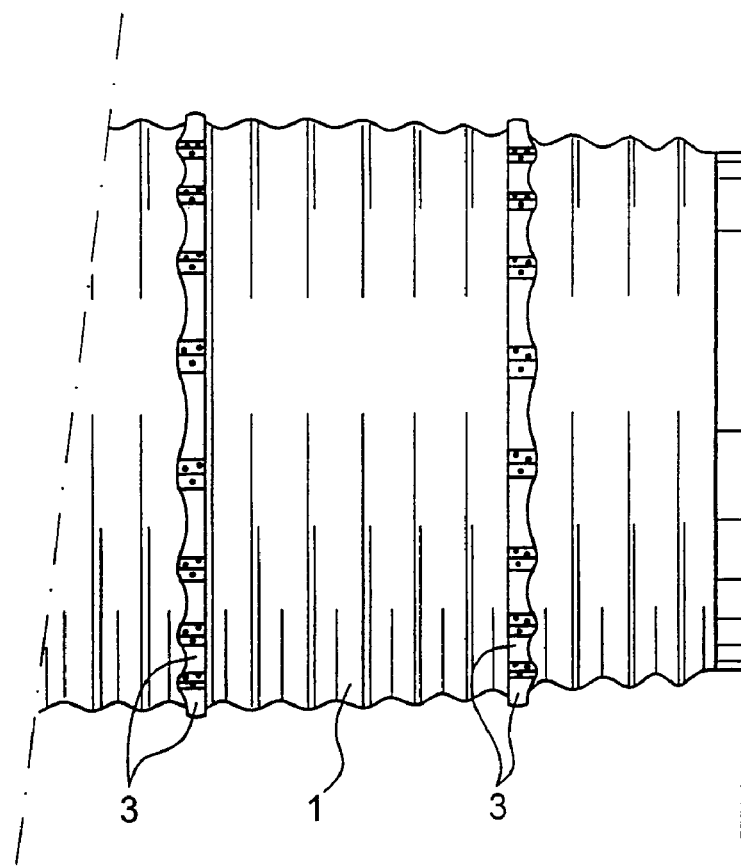
Figure 3:
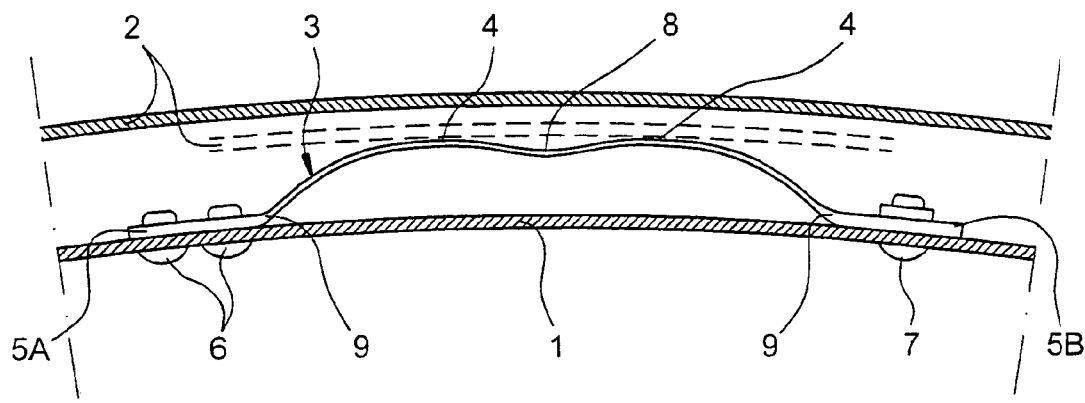
Figure 4:
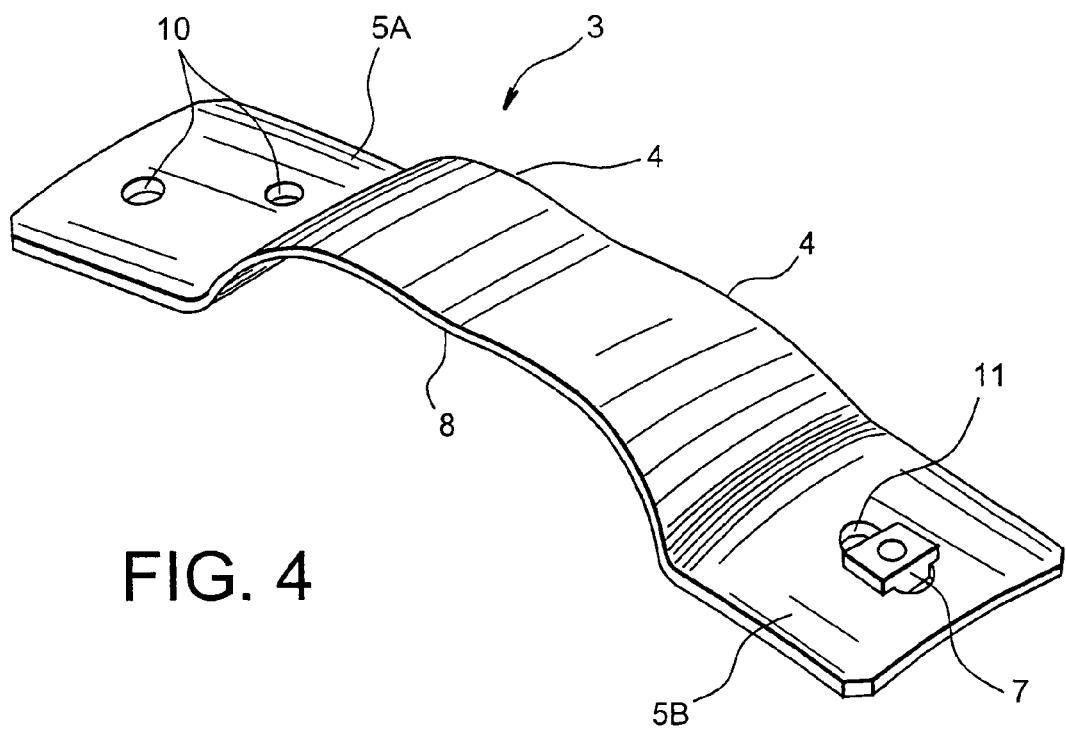

The invention and its different technical characteristics will be better understood by reading the following non-limiting description that is accompanied by four figures respectively representing:

FIG. 1, the circumferential positioning in the utilisation of bridge pieces according to the invention for a turboprop;

FIG. 2, the longitudinal positioning of bridge pieces according to the invention in this same utilisation for a turboprop;

FIG. 3, in cross-section, a bridge piece according to the invention positioned for utilisation in a turboprop; and FIG. 4, in isometric perspective, a bridge piece according to the invention.

DETAILED DESCRIPTION OF AN EMBODIMENT OF THE INVENTION

FIG. 1 shows the circumferential settings of bridge pieces 3 according to the invention, on a heat shield liner 1 of a turboprop nozzle. The two thin broken lines 2 represent the outer positions of the nozzle support pipe envelope. It can be seen that the space between the heat shield liner 1 and the cooling air bypass flow pipe envelope 2 is of the order of 10 mm. Consequently, the bridge pieces 3 are relatively flat. On the other hand, they must be able to support crushing of the order of 15 to 25% in height, while still ensuring sufficient mechanical hold.

FIG. 2 shows the longitudinal positioning of bridge pieces on the heat shield liner 1 of a turboprop nozzle. Thus it is possible and simple to produce several bridge piece 3 rows or rings over the whole length of this part in order to ensure the positioning of the cooling air bypass pipe envelope along its entire length.

FIG. 3 shows in more detail the shape of the bridge pieces 3, especially their cambered central part 8 surrounded by two lugs 5A and 5B. The latter are in contact with the heat shield liner 1.

The shape of the cambered central part 8 is thus characterised by two summit zones 4 extending to the lugs 5A and 5B. The two summit zones 4 each constitute a privileged contact point with the air bypass flow pipe envelope 2 (in this FIG. 3, the latter's position is shown in thin broken lines). In other words, the cambered central part 8 shows in inversed camber relative to the curvature of the summit zones 4. This geometry with inversed central cambering makes it possible to obtain clearly higher bending capacity for each bridge piece. In fact, the bridge pieces according to prior art usage only have very low flexibility on the bridge piece uprights.

Another characteristic complementing the inversed camber of the cambered central part 8 is the low radius of curvature of the joins 9 between this cambered central part 8 and lugs 5A and 5B. In this way, the bending zone in the cambered central part 8 of the bridge piece is optimized. Bending can thus take place because of the inversed camber orienting the bending by privileging one deformation direction. Furthermore, this allows utilisation of the geometry instability. It is thus possible to absorb a radial differential expansion between two parts through tangential bending.

The bridge piece as a whole is in contact with the heat shield liner 1 through fixation of the left lug 5A by means of a rivet 6 and by means of a guide pin 7 that allows lug 5B a certain degree of freedom relative to the heat shield liner 1. These details are more visible in FIG. 4, which shows the bridge piece and its two lugs 5A and 5B.

The left lug 5A is provided with fixation holes 10 to be fixed integrally to the heat shield liner 1. It is to be noted here that the bridge piece is made from a relatively wide metallic bar. The right lug 5B is provided with a slot 11 whose axis is parallel to the longitudinal axis of the bar constituting the bridge piece. A guide pin 7 is fixed in the heat shield liner and is T-shaped. The head of the T extends above the slot 11 whereas the foot of the T is inserted inside it. In this way, the bridge piece can undergo length variations in the longitudinal direction, due to significant temperature differences relative to those undergone by the heat shield liner 1. In fact, the guide pin 7 can move in the longitudinal direction of the slot 11 and allow relative movement of the heat shield liner in this bridge piece direction. Furthermore, this link with a degree of freedom limits stresses in the bridge piece.

Thus, the bridge piece plays its role of damper in an optimised way and so limits the risks of damaging the heat shield liner and the nozzle support pipe envelope, that are very much more expensive parts than the proposed bridge piece. In fact, it is the latter that absorbs almost all the whole of the deformations during the turbojet operation. Thus it plays the role of a fuse. It can also be seen that the buckling capacity of the heat shield liner is increased by using such bridge pieces.

Referring once again to FIG. 1, it is understood that the use of a large number of bridge pieces 3, spaced around the whole circumference of a heat shield liner 1 allows optimised relative positioning of the latter relative to the nozzle support pipe envelope.

The invention claimed is:

1. A bridge piece for positioning a first part and a second part relative to each other, said first and second parts being susceptible to variations in their relative positions, said bridge piece including a bar comprising:
   a first lug located at a first end of the bar;
   a second lug located at a second end of said bar, said second end being opposite of said first end, wherein said first and second lugs contact said first part; and
   a cambered part between said first and second lugs, said cambered part including:
      a first rising portion that rises from the first lug and peaks at a first summit zone;
      a first descending portion descending from the first summit zone;
      a second rising portion that rises from the second lug and peaks at a second summit zone;
      a second descending portion descending from the second summit zone; and
      a central portion centered between the two summit zones defining an inversed central camber, wherein
   the first and second descending portions meet at the central portion,
   the two summit zones form two contact points between said bar and said second part, and
   said central portion is centered between said first and second ends of said bar.

2. A bridge piece according to claim 1, wherein said first lug is fixed to said first part, and wherein said second lug is not fixed to said first part and contacts said first part so as to be movable tangentially relative to the first part.

3. A bridge piece according to claim 2, wherein said second lug defines a slot in a longitudinal direction of said bar.

4. A bridge piece according to claim 3, wherein said slot is configured to receive a foot of a T-shaped guide pin integral with the first part.

5. A bridge piece according to claim 1, wherein said bar comprises linking parts between the lugs and the cambered part, said linking parts having a low radius of curvature.

6. A bridge piece according to claim 1, wherein said first part is a heat shield liner and said second part is a nozzle support pipe envelope of a turboprop.

7. A bridge piece according to claim 1, wherein said bar is a metallic bar.

8. A bridge piece according to claim 1, wherein said cambered part has only said two summit zones between said first and second lugs such that only two contact points contact said second part.

9. A bridge piece according to claim 1, wherein said cambered part is configured to maintain a distance between said first and second parts of the order of 10 mm.

10. A bridge piece according to claim 1, wherein said bar is configured to support crushing between 15 and 25% in height of the piece.

11. A bridge piece according to claim 1, wherein said central portion is centered between said two summit zones.

12. A bridge piece according to claim 11, wherein said cambered part is symmetric with respect to said central portion.

13. A bridge piece according to claim 3, wherein said first lug defines two fixation holes.

14. A bridge piece according to claim 13, wherein said two fixation holes are not aligned with said longitudinal direction of said bar.

\* \* \* \* \*